(12) United States Patent
Krüger (10) Patent No.: US 8,647,691 B2
(45) Date of Patent: Feb. 11, 2014

(54) BREWING DEVICE AND METHOD FOR EXTRACTING A PORTION CAPSULE

(75) Inventor: Marc Krüger, Bergisch Gladbach (DE)

(73) Assignee: Eugster Frismag AG Elektrohushaltgeraete, Amriswill (CH)

( * ) Notice: Subject to any disclaimer, the term of this patent is extended or adjusted under 35 U.S.C. 154(b) by 5 days.

(21) Appl. No.: 13/502,839

(22) PCT Filed: Oct. 19, 2010

(86) PCT No.: PCT/EP2010/006349
§ 371 (c)(1),
(2), (4) Date: Apr. 19, 2012

(87) PCT Pub. No.: WO2011/047815
PCT Pub. Date: Apr. 28, 2011

(65) Prior Publication Data
US 2012/0207893 A1    Aug. 16, 2012

Related U.S. Application Data

(60) Provisional application No. 61/252,873, filed on Oct. 19, 2009.

(30) Foreign Application Priority Data

Oct. 19, 2009   (DE) .......................... 10 2009 049 945

(51) Int. Cl.
*A47J 31/44*    (2006.01)
*A23L 2/38*    (2006.01)

(52) U.S. Cl.
USPC ........... 426/431; 426/433; 426/432; 426/435; 426/436; 99/295; 99/279; 99/289 R; 99/300

(58) Field of Classification Search
USPC ............ 426/433, 431, 432, 435, 436; 99/295, 99/279, 289 R, 300
See application file for complete search history.

(56) References Cited

U.S. PATENT DOCUMENTS

| | | | | |
|---|---|---|---|---|
| 6,079,315 | A * | 6/2000 | Beaulieu et al. | ............ 99/289 R |
| 6,182,554 | B1 * | 2/2001 | Beaulieu et al. | ............ 99/289 R |
| 6,644,173 | B2 * | 11/2003 | Lazaris et al. | ................. 99/295 |
| 7,097,074 | B2 * | 8/2006 | Halliday et al. | ............... 222/85 |
| 7,216,582 | B2 * | 5/2007 | Yoakim et al. | ................ 99/295 |
| 7,231,869 | B2 * | 6/2007 | Halliday et al. | ........... 99/289 R |

(Continued)

FOREIGN PATENT DOCUMENTS

| | | |
|---|---|---|
| EP | 1495702 A1 | 1/2005 |
| EP | 2077087 A1 | 7/2009 |
| WO | 2010004376 A1 | 1/2010 |

*Primary Examiner* — Anthony Weier
(74) *Attorney, Agent, or Firm* — McNees Wallace & Nurick LLC (57) ABSTRACT

The invention proposes a brewing apparatus for extracting a portion capsule, having an accommodation element, which has a cavity for the portion capsule, and a closure element, it being possible for the closure element to move between a loading position, which is at a distance from the accommodation element, and an extraction position, which closes the cavity, and the brewing apparatus having a holding element for holding the portion capsule in the loading position, and furthermore the holding element being designed in such a way that the portion capsule is aligned substantially in the direction of the accommodation element by the holding element by virtue of the movement of the closure element from the loading position to the extraction position.

20 Claims, 5 Drawing Sheets

(56) References Cited

U.S. PATENT DOCUMENTS

| | | | |
|---|---|---|---|
| 7,469,628 B2* | 12/2008 | Mandralis et al. | 99/295 |
| 7,569,243 B2* | 8/2009 | Yoakim et al. | 426/433 |
| 7,592,027 B2* | 9/2009 | Halliday et al. | 426/433 |
| 7,607,385 B2* | 10/2009 | Halliday et al. | 99/280 |
| 8,109,200 B2* | 2/2012 | Hansen | 99/295 |
| 8,272,319 B2* | 9/2012 | Jarisch et al. | 99/289 R |
| 2005/0235834 A1* | 10/2005 | Blanc et al. | 99/279 |
| 2007/0144355 A1* | 6/2007 | Denisart et al. | 99/275 |
| 2008/0148957 A1* | 6/2008 | Zanetti | 99/295 |
| 2009/0035438 A1* | 2/2009 | Cortese | 426/590 |
| 2009/0114100 A1* | 5/2009 | Spinelli | 99/289 R |
| 2009/0183640 A1* | 7/2009 | Ozanne | 99/295 |
| 2009/0308258 A1* | 12/2009 | Boussemart et al. | 99/295 |
| 2012/0210876 A1* | 8/2012 | Glucksman et al. | 99/281 |

\* cited by examiner

BREWING DEVICE AND METHOD FOR EXTRACTING A PORTION CAPSULE

BACKGROUND OF THE INVENTION

The present invention relates to a brewing apparatus for extracting a portion capsule, having an accommodation element, which has a cavity for the portion capsule, and a closure element, it being possible for the closure element to move between a loading position, which is at a distance from the accommodation element, and an extraction position, which closes the cavity, and the brewing apparatus having a holding element for holding the portion capsule in the loading position.

Brewing apparatuses of this kind are generally known. For example, EP 2 077 087 A1 discloses a brewing apparatus for a portion capsule having an automatic ejection mechanism. In that document, the brewing apparatus comprises an accommodation element with a cavity for accommodating the portion capsule and a closure element for closing the cavity. In this case, the closure element comprises an injection arrangement for injecting extraction liquid into the portion capsule, while the accommodation element comprises an extraction arrangement in order to discharge the extraction liquid, which interacts with a beverage substance which is arranged in the portion capsule, from the portion capsule and to supply said extraction liquid to a vessel for the purpose of preparing a beverage. In order to charge the brewing apparatus with the portion capsule, the closure element is moved to a loading position in which it is at a distance from the accommodation element. The portion capsule is then inserted into an intermediate space between the accommodation element and the closure element, the portion capsule being accommodated and held by two side arms, which are arranged on the sides of the closure element, in the process. In this case, two L-shaped end sections of the side arms engage behind a flange of the portion capsule. The closure element is then displaced in the direction of the accommodation element and the portion capsule is inserted into the cavity in the accommodation element. In the process, the side arms are forcibly guided in each case into two linear guide paths, which are arranged on the sides, by means of projecting pins in such a way that the L-shaped end sections pivot, away from one another only shortly before the portion capsule is completely inserted into the cavity in the accommodation element and the flange of the portion capsule is released by the L-shaped end sections by virtue of the movement of the closure element, in the direction of the accommodation element. When the closure element returns, the pins are each guided in two bent guide paths, which are arranged at the sides, and therefore the L-shaped end sections remain at a distance from one another and come closer again only shortly before the loading position is reached. This leads, when the closure element returns, to the portion capsule not engaging with the L-shaped end sections and therefore falling into a collection container, which is arranged beneath the brewing chamber, under the action of gravity. The side arms consequently experience a kind of hysteresis as the closure element moves back and forth relative to the accommodation element. A disadvantage of this brewing apparatus is that the portion capsule is not aligned in the direction of the accommodation element before being inserted into the cavity in the accommodation element. As a result, there is a risk of the portion capsule butting against the edge of the accommodation element by way of the capsule base when the brewing chamber is closed and therefore correct closing of the brewing chamber not being possible. In order to reduce this risk, the intermediate space between the end sections and the closure element, which intermediate space is designed to accommodate the flange, has to be comparatively narrow so that the portion capsule is not inclined or only slightly inclined in relation to the movement direction of the closure element. However, this disadvantageously requires comparatively precise and therefore complicated insertion of the portion capsule when loading the brewing apparatus.

Therefore, the invention is based on the problem of providing a brewing apparatus and a method for extracting a portion capsule, which brewing apparatus and method do not exhibit the disadvantages of the prior art and therefore ensure considerably more reliable and convenient charging of the brewing apparatus with portion capsules. At the same time, the brewing apparatus can be produced in a comparatively cost-effective manner, is simple to install and can be employed universally.

SUMMARY OF THE INVENTION

According to the invention, this problem is solved by a brewing apparatus for extracting a portion capsule, having an accommodation element, which has a cavity for the portion capsule, and a closure element, it being possible for the closure element to move between a loading position, which is at a distance from the accommodation element, and an extraction position, which closes the cavity, and the brewing apparatus having a holding element for holding the portion capsule in the loading position, and furthermore the holding element being designed in such a way that the portion capsule is aligned substantially in the direction of the accommodation element by the holding element by virtue of the movement of the closure element from the loading position to the extraction position.

Therefore, the risk of the portion capsule butting against the edge of the accommodation element when the portion capsule is inserted into the cavity in the accommodation element is advantageously effectively prevented, and therefore firstly the shape of the accommodation element can be adapted more accurately to the outer circumference of the portion capsule, as a result of which greater leaktightness of the brewing chamber during the brewing process is achieved, and secondly it is not necessary to align the portion capsule when charging the brewing chamber with the portion capsule in the loading position. Therefore, handling of the brewing apparatus is considerably simpler compared to the prior art and the susceptibility of the brewing chamber to faults is reduced at the same time. The beverage substance arranged in the portion capsule comprises, in particular, coffee powder, chocolate powder, milk powder or the like. The brewing apparatus preferably comprises a coffee machine.

Advantageous refinements and developments of the invention can be gathered from the dependent claims and the description with reference to the drawings.

According to a preferred development, provision is made for the holding element to be designed such that it can move relative to the closure element at least over a partial distance, the portion capsule being aligned by virtue of a relative movement between the holding element and the closure element. In the loading position, the holding element is advantageously displaced to the maximum degree in the direction of the accommodation element in relation to the closure element, and therefore charging of the brewing apparatus with the portion capsule is comparatively simple, the holding element initially remaining stationary when the closure element moves in the direction of the accommodation element, and therefore the holding element and the closure element coming closer to one another, and therefore the portion capsule being aligned in the direction of the accommodation element. Therefore, the portion capsule is advantageously aligned, preferably before the closure element displaces the portion capsule in the direction of the accommodation element. In other words: the portion capsule is aligned by virtue of driving of the closure element and the resultant relative movement between the holding element and the closure element. Both the portion capsule and the holding element then move together with the closure element in the direction of the accommodation element.

According to a preferred development, provision is made, in the loading position, for an axial direction of the portion capsule, which direction is aligned, in particular, perpendicular to a portion capsule base and/or a portion capsule cover of the portion capsule, to form an angle of inclination in relation to the movement direction of the closure element, the angle of inclination being reduced, and preferably being substantially equal to zero, after the portion capsule is aligned, the angle of inclination preferably comprising an angle of between 5 and 35 degrees, preferably between 15 and 25 degrees, and particularly preferably of substantially 20 degrees, in the loading position. This advantageously ensures particularly precise insertion of the portion capsule into the cavity in the accommodation element.

According to a preferred development, provision is made for the closure element to have at least one perforation spike which projects away from the closure element in the direction of the accommodation element, the at least one perforation spike being provided to perforate the portion capsule, in particular during the alignment of the portion capsule. The portion capsule is therefore advantageously automatically perforated during the alignment process. This provides the option of designing the closure element to the effect that the perforation spike is, in contrast to the prior art, rigidly connected to the closure element, this resulting in comparatively cost-effective production of the brewing apparatus.

According to a preferred development, provision is made for the holding element to comprise two side arms which are arranged on the sides of the closure element and which are designed to be displaceable relative to the closure element, end sections of the side arms, which end sections face the accommodation element, projecting beyond the closure element in the direction of the accommodation element and preferably being bent in relation to one another at least partially in an L shape, and the L-shaped end sections particularly preferably being provided for engaging behind a flange of the portion capsule in the loading position and for pulling the flange in the direction of the closure element, when the closure element moves in the direction of the accommodation element.

According to a preferred development, provision is made for the brewing apparatus to have stops for the side arms, which stops are designed in such a way that there is at least brief abutment between the side arms and the stops in each case when the closure element moves in the direction of the accommodation element, and the end sections of the side arms move at least briefly in the direction of the closure element relative to the closure element. The capsule is aligned and/or the capsule is perforated in an advantageous manner by virtue of the design of the stops in a simple manner which is comparatively cost-effective to implement. The stop forms a mechanical barrier to the side arms as they move in the direction of the accommodation element, and therefore the side arms are displaced in the direction of the closure element when the closure element moves in the direction of the accommodation element. The side arms overcome the stops and move together with the closure element also in the direction of the accommodation element only when the side arms are displaced to the maximum, degree in the direction of the closure element.

According to a preferred development, provision is made for the side arms to be mounted in lateral guide paths such that they can slide, the guide paths extending substantially parallel to the movement direction and the stops in each case preferably comprising steps or tapered sections in the guide paths. The guide paths advantageously further comprise a curved further guide path on which the side arms remain at a distance from one another during the backward movement of the closure element in such a way that the portion capsule remains disengaged from the side arms and the used portion capsule can therefore fall out of the cavity in the accommodation element into a collection container after the end of the extraction process, for example, under the action of gravity and/or a spring element. The guide paths are, in particular, designed as in the prior art. The disclosure content of EP 2 077 087 A1 is therefore expressly included in the present description.

According to a preferred development, provision is made for the friction between the side arms and the guide paths to be of such a magnitude that the end sections of the side arms move at least briefly in the direction of the closure element relative to the closure element when the closure element moves in the direction of the accommodation element. The friction between the side arms and the guide path in the loading position advantageously generates a frictional force, which opposes the movement of the closure element, on the side arms, this frictional force sufficing to align the portion capsule and preferably to perforate said portion capsule during the alignment process.

According to a preferred development, provision is made for the side arms to in each case be coupled to the closure element by means of a spring element in such a way that the end sections of the side arms are prestressed in the direction of the closure element, the brewing apparatus having an end stop which is designed in such a way that, in the loading position, the end stop butts against the side arms and the end sections of the side arms are displaced in the direction of the accommodation element against a spring stress of the spring element, and in that, when the closure element moves in the direction of the accommodation element, the abutment between the end stops and the side arms is lifted and the portion capsule is aligned by the spring stress of the spring element. Therefore, the portion capsule is advantageously automatically aligned in a simple manner by relieving the spring element of stress.

The present invention also relates to a method for extracting a portion capsule using a brewing apparatus, the closure element being moved to the loading position in a first method step, the portion capsule being arranged in the brewing apparatus and held by the holding element in a second method step, the closure element being moved from the loading position in the direction of the accommodation element in a third method step, the portion capsule being aligned in the direction of the accommodation element by the holding element by virtue of the movement of the closure element in the process, the closure element being moved to the extraction position in a fourth method step, and a beverage being extracted from, the portion capsule by the introduction of extraction liquid into the portion capsule in a fifth method step. The method, according to the invention, as has already been described in detail above, advantageously permits the portion capsule to be aligned in the third method step, that is to say in particular before the portion capsule is inserted into the cavity in the accommodation element, and therefore the disadvantages described in connection with the prior art are avoided.

According to a preferred development, provision is made for the holding element to be moved in the direction of the closure element relative to the closure element by virtue of the movement of the closure element in the third method step, and therefore the portion capsule is advantageously tilted in such a way that a side of the portion capsule which faces the closure element, in particular the portion capsule cover, is brought into abutment, with the closure element and therefore that side of the portion capsule which is averted from the closure element, in particular the portion capsule base, points in the direction of the accommodation element.

According to a preferred development, provision is made for the portion capsule to be perforated, in particular by at least, one perforation spike which is coupled to the closure element, by virtue of the alignment of the portion capsule in the third method step, and therefore that side of the portion capsule which faces the closure element is advantageously automatically perforated. In contrast to the prior art, there is no need in this case for an additional method step or an additional mechanism for perforating the portion capsule, this additional mechanism involving a relative movement of the perforation spike relative to the closure element.

According to a preferred development, provision is made for the accommodation element to be disengaged from the portion capsule, before or as the closure element reaches the extraction position, in the fourth method step, and/or for the closure element to be removed from the accommodation element again in a sixth method step, and therefore the portion capsule falls out of the accommodation element into a collection container under the action of gravity. Consequently, the brewing chamber is firstly effectively sealed off during the extraction process and secondly the used portion capsule is preferably automatically ejected when the closure element returns.

According to a preferred development, provision is made for the holding element to be moved in the direction of the accommodation element relative to the closure element by virtue of the movement of the closure element in the sixth method step, the first method step preferably being carried out again after the sixth method step. The brewing apparatus is therefore advantageously put back again to the starting position (loading position) and prepared for a new extraction process.

According to a preferred development, provision is made for the holding element in the form of two side arms, which are mounted on the sides of the closure element, to be moved in the direction of the closure element by virtue of the movement of the closure element in the third method step, and therefore a flange of the portion capsule being pivoted in the direction of the closure element by two L-shaped end sections of the side arms. In this case, the side arms are, in particular, in each case guided in laterally arranged guide paths, the side arms in each case being pushed against a stop, in particular in the form of a step or a tapered section in the guide paths, in the third method step. The portion capsule is preferably perforated at the same time in this case.

According to a preferred development, provision is made for the side arms to be moved in the direction of the closure plunger by a spring element in the third method step, the spring element preferably being stressed in the direction of the closure element in the first method step, and the side arms particularly preferably in each case being brought into abutment with an end stop in the first method step.

According to a preferred development, provision is made for the portion capsule to be inserted into the accommodation element in the fourth method step, in particular, the portion capsule being perforated by a puncturing element, which is arranged in the accommodation element, on that side which faces the accommodation element in the process.

The invention will be explained in greater detail below with reference to exemplary embodiments which are illustrated in the drawings which show only exemplary embodiments of the invention which do not limit the essential idea of the invention.

BRIEF DESCRIPTION OF THE DRAWINGS

Throughout the various figures, identical parts are provided with the same reference symbols and are therefore generally specified or mentioned only once in each case.

DETAILED DESCRIPTION OF THE INVENTION

Figure 1A:
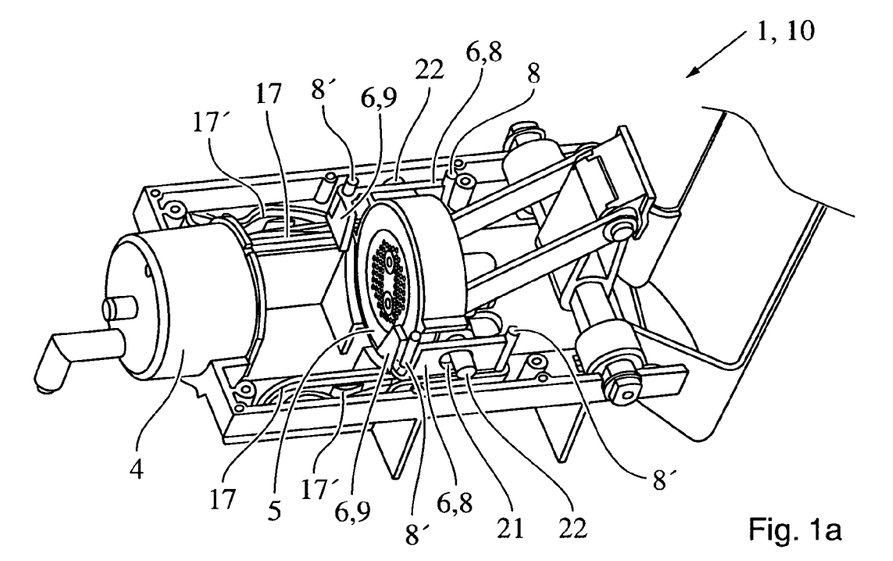
FIG. 1a shows a schematic perspective view of a brewing apparatus according to a first embodiment of the present invention.
Figure 1B:
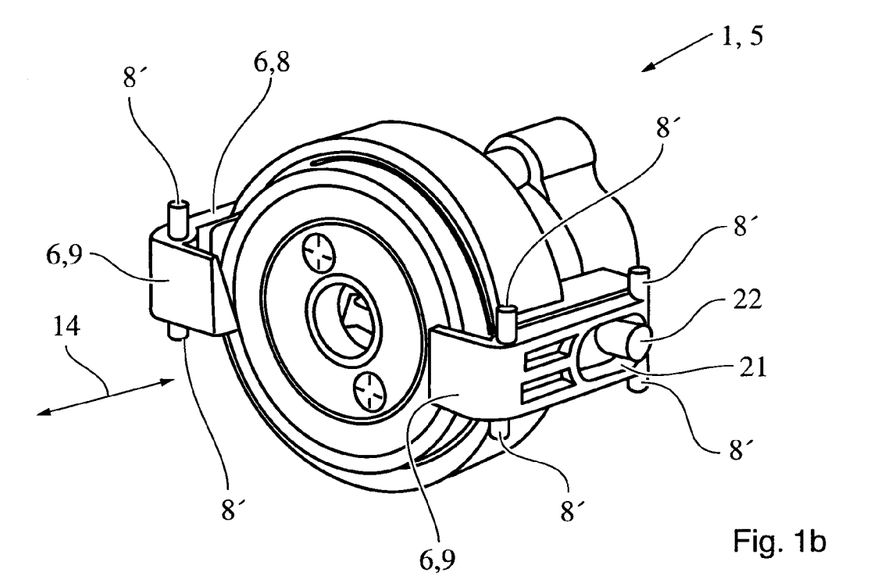
FIG. 1b shows a schematic perspective view of a closure element of a brewing apparatus according to the first embodiment of the present invention.

FIG. 1a illustrates a schematic perspective view of a brewing apparatus 1 according to a first embodiment of the present invention, and FIG. 1b illustrates a schematic perspective view of a closure element 5 of a brewing apparatus 1 according to the first embodiment of the present invention. In this case, the brewing apparatus 1 substantially resembles the brewing apparatus 1 disclosed in EP 2 077 087 A1 for a portion capsule 2 having an automatic ejection mechanism. In that document, the brewing apparatus 1 comprises an accommodation element 4 with a cavity 3 for accommodating the portion capsule 2 (not depicted in FIGS. 1a and 1b) and a closure element 5 for closing the cavity 3 in order to create a closed brewing chamber. In said document, the closure element 5 comprises an injection arrangement for injecting extraction liquid into the portion capsule 2, while the accommodation element 4 comprises an extraction arrangement in order to discharge the extraction liquid, which interacts with a beverage substance which is arranged in the portion capsule 2, from the portion capsule 2 and to supply said extraction liquid to a vessel for the purpose of providing a beverage. In order to manually (or alternatively automatically) charge the brewing apparatus 1 with the portion capsule 2, the closure element 5 is moved to a loading position 10 (illustrated in FIG. 1a) in which it is at a distance from the accommodation element 4. The portion capsule 2 is then inserted into the intermediate space between the accommodation element 4 and the closure element 5, the portion capsule 2 being accommodated by two side arms 8, which are arranged on the sides of the closure element 5, in the process. In this case, two L-shaped end sections 9 of the side arms 8 engage behind, for example, a flange 2' of the portion capsule 2. The closure element 5 is then displaced in the direction of the accommodation element 4 and the portion capsule 2 is inserted into the cavity 3 in the accommodation element 4. In the process, the side arms 8 are forcibly guided in each case into two linear inner guide paths 17, which are arranged on the sides, by means of projecting pins 8' in such a way that the L-shaped end sections 9 pivot away from one another only shortly before the brewing apparatus 1 reaches its extraction position, that is to say the portion capsule 2 is virtually completely arranged, in the cavity 3 in the accommodation element 4, and the flange 2' of the portion capsule 2 is released by the L-shaped end sections 9 by virtue of the movement of the closure element 5 in the direction of the accommodation element 4. When the closure element 5 returns to the loading position 10, the pins 8' are each at least partially guided in two outer bent guide paths 17', which are arranged at the sides and are arranged offset towards the outside, analogously to the inner guide paths 17, and therefore the L-shaped end sections 9 remain at a distance from one another when the closure element 5 returns and come closer to one another again only shortly before the loading position 10 is finally reached. This leads, when the closure element 5 returns, to the used portion capsule 2 not re-engaging with the L-shaped end sections 9 and therefore falling into a collection container (not illustrated), which is arranged beneath the brewing chamber, under the action of gravity. The side arms 8 consequently experience a kind of hysteresis as the closure element 5 moves back and forth, relative to the accommodation element 4. FIG. 1b illustrates an enlarged schematic perspective view of the closure element 5. The side arms 8 each have an elongate hole 21 into which a bolt 22 of the closure element 5 engages in each case, said bolt extending perpendicular to the movement direction 14 of the closure element 5, and therefore the side arms 8 are at least partially moved along the movement direction 14 by the closure element 5. Furthermore, in accordance with the extension of the elongate hole 21 parallel to the movement direction 14, a relative movement between the closure element 5 and the side arms 8 is possible, and therefore the end sections 9 are at a maximum distance from the closure element 5 in the direction of the accommodation element 4 in the loading position 10 in order to allow the portion capsule 2 to be inserted in a simple manner and, when the closure element 5 is moved to the extraction position 11, to allow the end sections 9 to be displaced in the direction of the closure element 5. This is achieved, for example, in that the inner guide path 17 has a stop 16, which is in the form of a step 16', for the pins 8', and therefore a mechanical resistance has to be overcome when the side arms 8 are moved in the direction of the accommodation element 4, or in that the friction between the pins 8' and the inner guide path 16 is selected to be of a corresponding magnitude. In contrast to the prior art, the flange 2' of the portion capsule 2 is thereby pivoted in the direction of the closure element 5 and the portion capsule 2 or a side (in particular a base region) of the portion capsule 2, which side faces the accommodation element 4, is aligned in the direction of the accommodation element 4 by the holding element 6, and therefore contact between the edge of the cavity 3 and the portion capsule 2 is prevented when the portion capsule 2 is inserted into the cavity 3 in the accommodation element 4.

Figure 2A:
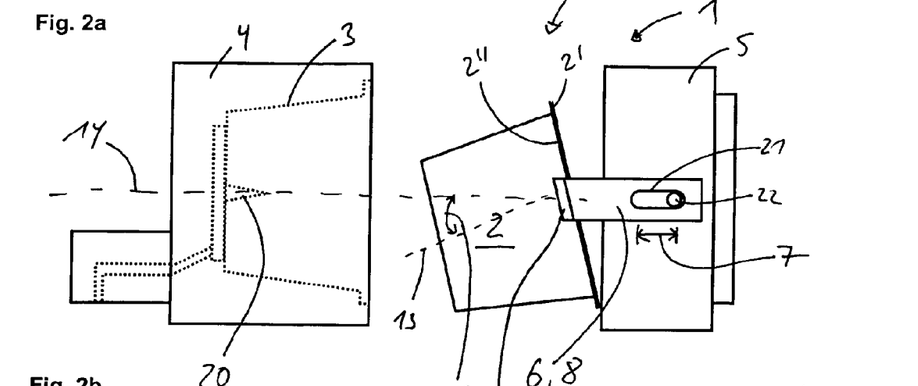
FIGS. 2a, 2b, and 2c show a schematic illustration of a method for extracting a brewing apparatus according to a first embodiment of the present invention.
Figure 2B:
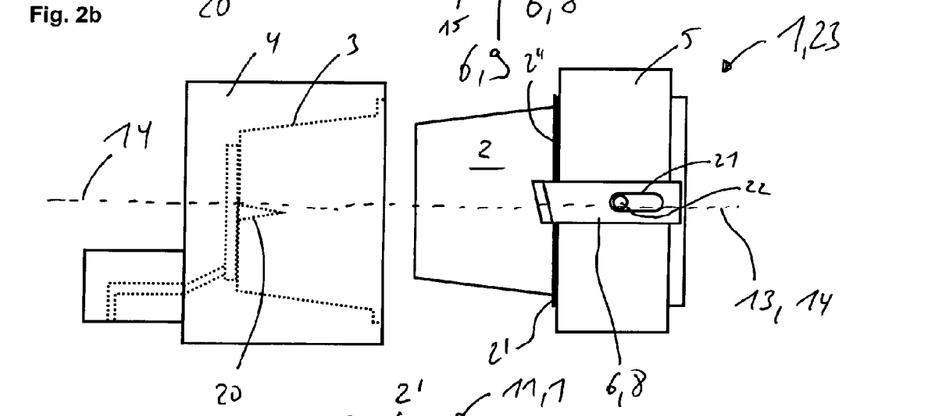
Figure 2C:
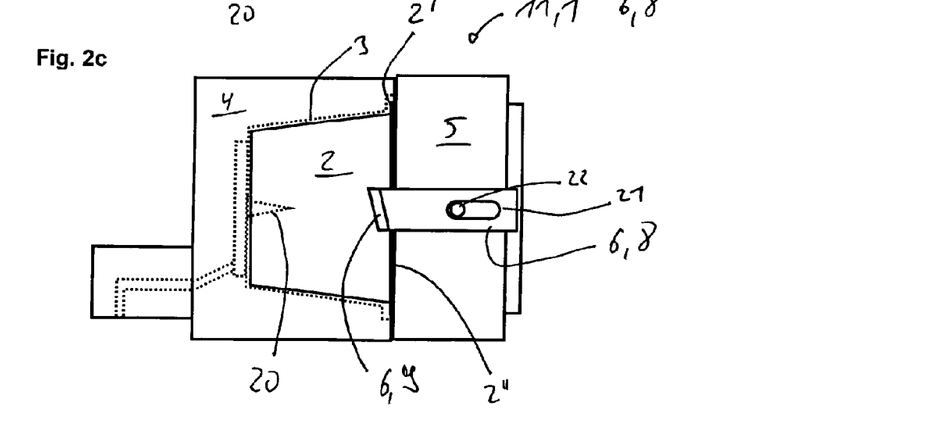

FIGS. 2a to 2c show a schematic illustration of a method for extracting a brewing apparatus 1 according to a first embodiment of the present invention, the brewing apparatus 1 illustrated in FIG. 1a being schematically depicted in the loading position 10 in FIG. 2a, in an intermediate position 23 (immediately after the portion capsule 2 is aligned) in FIG. 2b, and in the extraction position 11 in FIG. 2c. In first and second method steps, illustrated with reference to FIG. 2a, the closure element 5 is moved to the loading position 10 and the portion capsule 2 is arranged in the brewing apparatus 1 and held by the holding element 6, the holding elements 6 comprising the two side arms 8, and the L-shaped end sections 9 of the side arms 8 engaging behind the flange 2' of the portion capsule 2. The portion capsule 2 is aligned relative to the brewing apparatus 1 in such a way that an axial direction 13 of the portion capsule 2, which is aligned, in particular, perpendicular to a portion capsule cover 2" of the portion capsule 2, forms an angle 15 of inclination in relation to the movement direction 14 of the closure element 5, the angle of inclination comprising an angle of between 5 and 35 degrees, preferably between 15 and 25 degrees, and particularly preferably of substantially 20 degrees. A third method step is illustrated with reference to the intermediate position 23 illustrated in FIG. 2b, the closure element 5 being moved from the loading position 10 in the direction of the accommodation element 4, the portion capsule 2 being aligned in the direction of the accommodation element 4 by the holding element 6 and, in particular, by the L-shaped end sections 9 of the side arms 8 by virtue of the movement of the closure element 5. This is achieved by virtue of a relative movement between the side arms 8 and the closure element 5 by virtue of which the end sections 9 move in the direction of the closure element 5. By aligning the portion capsule 2, the angle 15 of inclination is reduced and is then, in particular, substantially equal to zero. A fourth and fifth method step are illustrated with, reference to FIG. 2c, the closure element 5 being moved further to the extraction position 11 in the fourth method step and a beverage being extracted from the portion capsule 2 by introducing extraction liquid into the portion capsule 2 in a fifth method step. In this case, the extraction liquid is preferably supplied by the closure element 5 to the portion capsule 2, the closure element 5 being supplied with the extraction liquid by a pump (not depicted) and a heating apparatus. A perforation spike 20 is arranged inside the cavity 3 of the accommodation element 4, and therefore the portion capsule 2 is automatically perforated on that side which faces the accommodation element 4, in particular the portion capsule base, in the fourth method step.

Figure 3A:
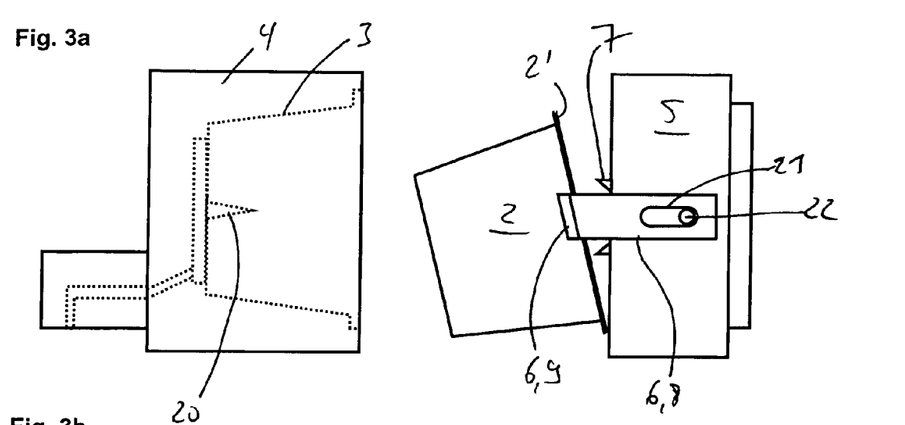
FIGS. 3a, 3b, and 3c show a schematic illustration of a method for extracting a brewing apparatus according to a second embodiment of the present invention.
Figure 3B:
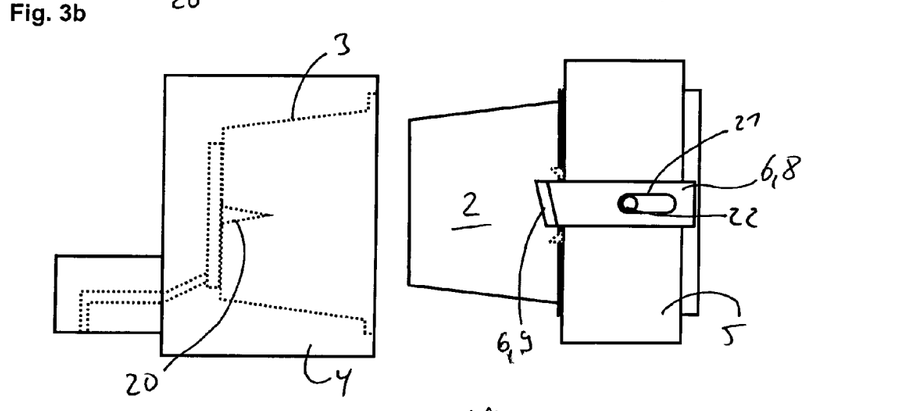
Figure 3C:
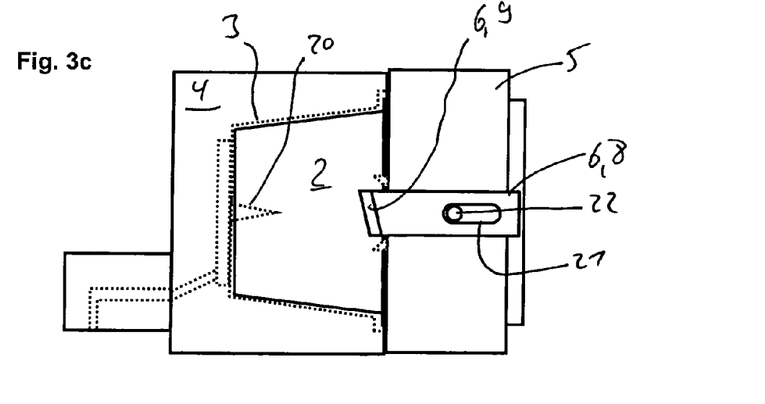

FIGS. 3a to 3c show a schematic illustration of a method for extracting a brewing apparatus 1 according to a second embodiment of the present invention, the second embodiment being substantially identical to the first embodiment illustrated in FIGS. 2a to 2c but the closure element 5 having a plurality of puncturing elements 20 which extend in the direction of the accommodation element 4 parallel to the movement direction 14 and by virtue of which that side of the portion capsule 2 which faces the closure element 5, in particular the portion capsule cover 2", is perforated during the alignment of the portion capsule 2 in the third method step. This makes it possible to introduce the extraction liquid into the portion capsule 2 through the perforation openings made by the puncturing elements 20 in the extraction position. The puncturing elements 20 are preferably rigidly connected to the closure element 5.

Figure 4A:
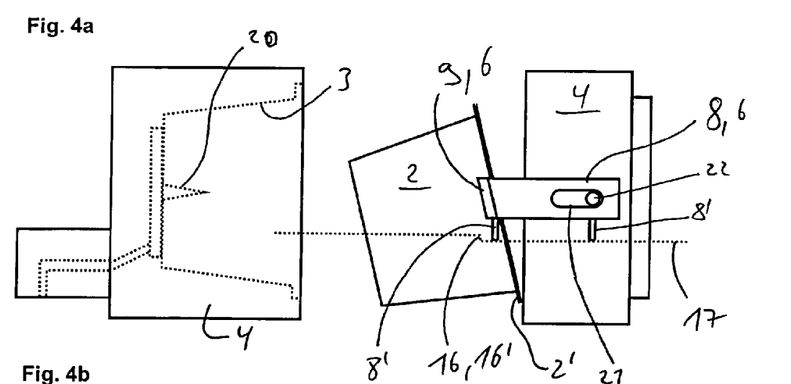
FIGS. 4a, 4b, and 4c show a schematic illustration of a method for extracting a brewing apparatus according to a third embodiment of the present invention.
Figure 4B:
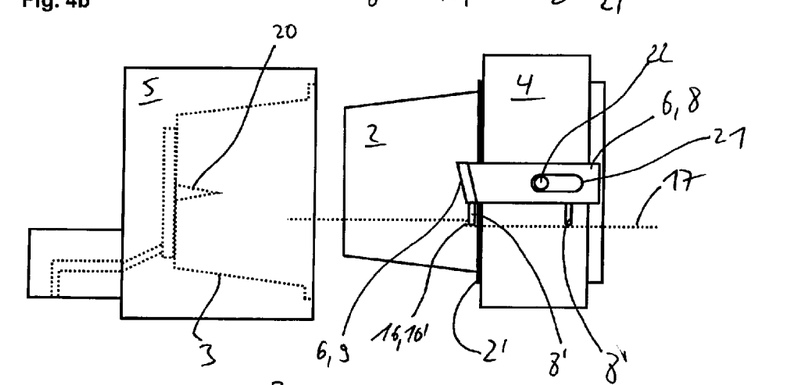
Figure 4C:
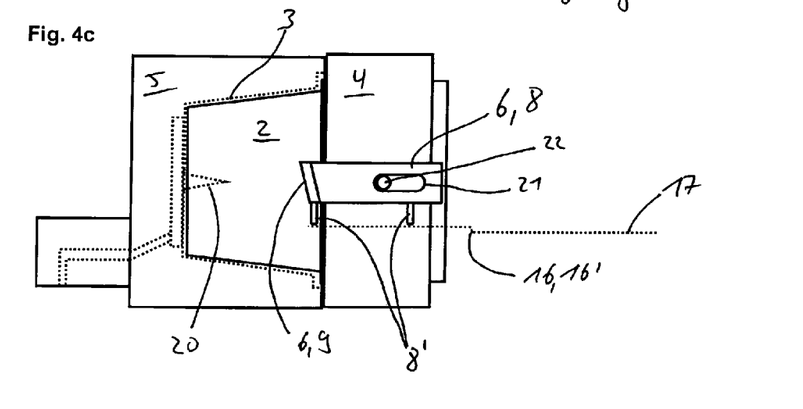

FIGS. 4a to 4c show a schematic illustration of a method for extracting a brewing apparatus 1 according to a third embodiment of the present invention, the third embodiment being substantially identical to the first embodiment illustrated in FIGS. 2a to 2c but the inner guide paths 17 additionally being schematically illustrated as dashed lines. The side arms 8 slide on the inner guide paths 17 by means of the pins 8'. In the third embodiment, the inner guide path has a stop 16 which is in the form, of a step 16'. When the closure element 5 moves in the direction of the accommodation element 4 in the third method step, the pins 8' butt against the step 16', and therefore a relative movement is produced between the side arms 8 and the end sections 9 in the direction of the closure element 5 and therefore the portion capsule 2 is aligned. The pins 8' only then overcome the step 16' and slide in the direction of the accommodation element 5 together with the closure element 4.

Figure 5A:
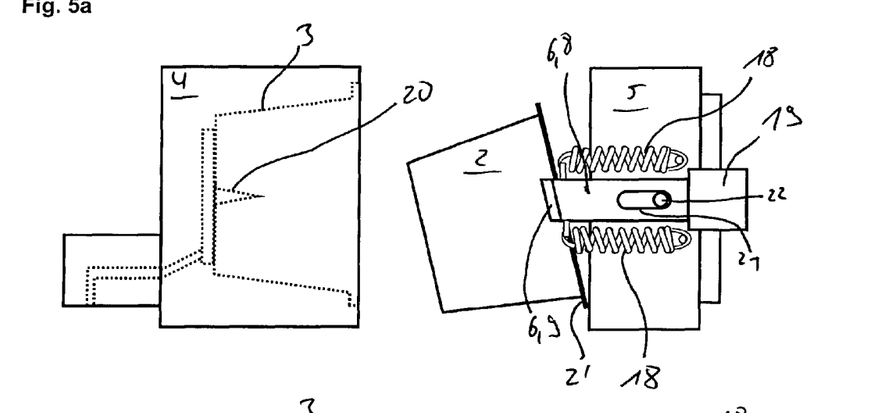
FIGS. 5a, 5b, and 5c show a schematic illustration of a method for extracting a brewing apparatus according to a fourth embodiment of the present invention.
Figure 5B:
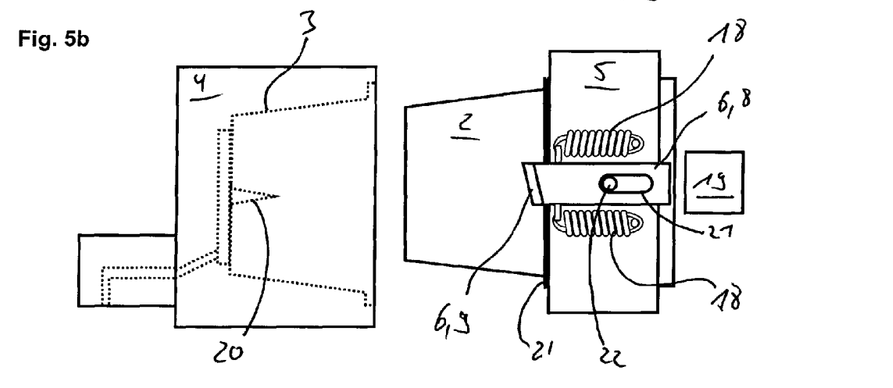
Figure 5C:
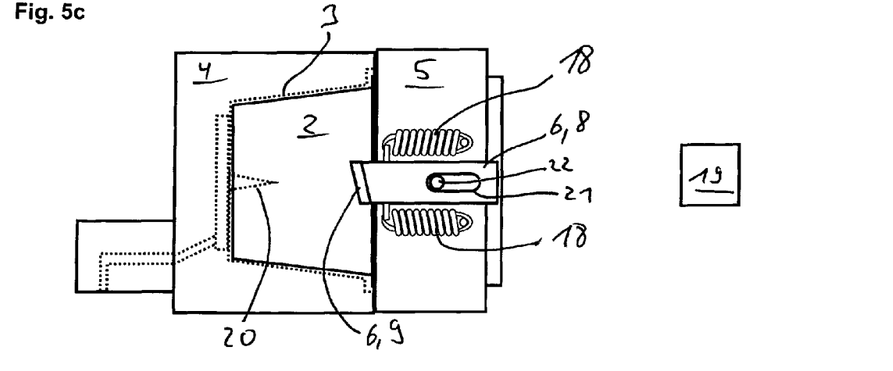

FIGS. 5a to 5c show a schematic illustration of a method for extracting a brewing apparatus according to a fourth embodiment of the present invention, the fourth embodiment being substantially identical to the first embodiment illustrated, in FIGS. 2a to 2c but the side arms 8 each being coupled to the closure element 5 by means of a spring element 18 in the form of a helical spring. The brewing apparatus 1 according to the fourth embodiment also has an end stop 19 which prevents the side arms 8 from returning fully when the closure element 3 returns to the loading position 10 from the extraction position 11 in the sixth method step, and therefore the side arms 8 move in the direction of the accommodation element 4 relative to the closure element 5 and the spring elements 18 are stressed. When the closure element 5 moves in the direction of the accommodation element 4 in the third method step, the end stops 9 are moved in the direction of the closure element 5 by said spring stress, and the portion capsule 2 is aligned and optionally perforated.

The invention claimed is:

1. Brewing apparatus for extracting a portion capsule, having an accommodation element, which has a cavity for the portion capsule, and a closure element, the closure element being movable between a loading position, which is at a distance from the accommodation element, and an extraction position, which closes the cavity, and the brewing apparatus having a holding element for holding the portion capsule in the loading position, characterized in that the holding element is designed in such a way that the portion capsule is aligned substantially in the direction of the accommodation element by the holding element by virtue of the movement of the closure element from the loading position to the extraction position, wherein the closure element has at least one perforation spike which projects away from the closure element in the direction of the accommodation element, the at least one perforation spike being provided to perforate the portion capsule during the alignment of the portion capsule.

2. Brewing apparatus according to claim 1, characterized in that the holding element is designed such that it can move relative to the closure element at least over a partial distance, the portion capsule being aligned by virtue of a relative movement between the holding element and the closure element.

3. Brewing apparatus according to claim 1, characterized in that, in the loading position, an axial direction of the portion capsule, which direction is aligned perpendicular to a portion capsule base and/or a portion capsule cover of the portion capsule, forms an angle of inclination in relation to the movement direction of the closure element, the angle of inclination being substantially equal to zero, after the portion capsule is aligned.

4. Brewing apparatus according to claim 3, characterized in that the angle of inclination comprises an angle of between 5 and 35 degrees, in the loading position.

5. Brewing apparatus according to claim 1, characterized in that the holding element comprises two side arms which are arranged on the sides of the closure element and which are designed to be displaceable relative to the closure element, end sections of the side arms, which end sections face the accommodation element, projecting beyond the closure element in the direction of the accommodation element and being bent in relation to one another at least partially in an L shape, and the L-shaped end sections being provided for engaging behind a flange of the portion capsule in the loading position and for pulling the flange in the direction of the closure element when the closure element moves in the direction of the accommodation element.

6. Brewing apparatus according to claim 5, characterized in that the brewing apparatus has stops for the side arms, which stops are designed in such a way that there is at least brief abutment between the side arms and the stops in each case when the closure element moves in the direction of the accommodation element, and the end sections of the side arms move at least briefly in the direction of the closure element relative to the closure element.

7. Brewing apparatus according to claim 6, characterized in that the side arms are mounted in lateral guide paths such that they can slide, the guide paths extending substantially parallel to the movement direction and the stops in each case comprising steps or tapered sections in the guide paths.

8. Brewing apparatus according to claim 7, characterized in that the friction between the side arms and the guide paths is of such a magnitude that the end sections of the side arms move at least briefly in the direction of the closure element relative to the closure element when the closure element moves in the direction of the accommodation element.

9. Brewing apparatus according to claim 5, characterized in that the side arms are in each case coupled to the closure element by means of a spring element in such a way that the end sections of the side arms are prestressed in the direction of the closure element, the brewing apparatus having an end stop which is designed in such a way that, in the loading position, the end stop butts against the side arms and the end sections of the side arms are displaced in the direction of the accommodation element against a spring stress of the spring element, and in that, when the closure element moves in the direction of the accommodation element, the abutment between the end stops and the side arms is lifted and the portion capsule is aligned by the spring stress of the spring element.

10. Method for extracting a portion capsule using a brewing apparatus according to claim 1, characterized in that the closure element is moved to the loading position in a first method step, in that the portion capsule is arranged in the brewing apparatus and held by the holding element in a second method step, in that the closure element is moved from the loading position in the direction of the accommodation element in a third method step, the portion capsule being aligned in the direction of the accommodation element by the holding element by virtue of the movement of the closure element, in that the closure element is moved to the extraction position in a fourth method step, and in that a beverage is extracted from the portion capsule by the introduction of extraction liquid into the portion capsule in a fifth method step.

11. Method according to claim 10, characterized in that the holding element is moved in the direction of the closure element relative to the closure element by virtue of the movement of the closure element in the third method step.

12. Method according to claim 10, characterized in that the portion capsule is perforated by at least one perforation spike which is coupled to the closure element by virtue of the alignment of the portion capsule in the third method step.

13. Method according to claim 10, characterized in that the accommodation element is disengaged from the portion capsule, before or as the closure element reaches the extraction position, in the fourth method step.

14. Method according claim 10, characterized in that the closure element is removed from the accommodation element again in a sixth method step, and the portion capsule falls out of the accommodation element into a collection container under the action of gravity.

15. Method according to claim 14, characterized in that the holding element is moved in the direction of the accommodation element relative to the closure element by virtue of the movement of the closure element in the sixth method step, the first method step being carried out again after the sixth method step.

16. Method according to claim 10, characterized in that the holding element in the form of two side arms, which are mounted on the sides of the closure element, is moved in the direction of the closure element by virtue of the movement of the closure element in the third method step, and a flange of the portion capsule is pivoted in the direction of the closure element by two L-shaped end sections of the side arms.

17. Method according to claim 16, characterized in that the side arms are in each case guided in laterally arranged guide paths, the side arms in each case being pushed against a stop in the form of a step or a tapered section in the guide paths in the third method step.

18. Method according to claim 16, characterized in that the side arms are moved in the direction of the closure element by a spring element in the third method step.

19. Method according to claim 18, characterized in that the spring element is stressed in the direction of the closure element in the first method step, the side arms in each case being brought into abutment with an end stop in the first method step.

20. Method according to claim 10, characterized in that the portion capsule is inserted into the accommodation element in the fourth method step, the portion capsule being perforated by a puncturing element, which is arranged in the accommodation element, on that side which faces the accommodation element in the process.

* * * * *